United States Patent [19]
Potter

[11] Patent Number: 5,131,834
[45] Date of Patent: Jul. 21, 1992

[54] SILICONE GEL ISOSTATIC PRESSURIZING BAG AND METHOD OF USE AND MANUFACTURE

[75] Inventor: John E. Potter, Camarillo, Calif.

[73] Assignee: Northrop Corporation, Los Angeles, Calif.

[21] Appl. No.: 633,571

[22] Filed: Dec. 21, 1990

[51] Int. Cl.$^5$ ............................................. B29C 45/16
[52] U.S. Cl. ................................. 425/389; 425/403; 425/405.2; 425/417; 425/419; 249/65; 249/179; 156/224; 156/292; 156/245; 156/285; 264/257; 264/510; 264/313; 264/314; 264/219
[58] Field of Search ............... 264/40.1, 40.2, 233, 264/257, 258, 316, 29.5, 314, 552, 546, 102, 572, 313, 324, 325, 500, 544, 570, 510, 136, 137, 331.11, 331.12, 219; 425/78, 389, 403, 417, 419, 405.1, 405.2; 249/65, 179; 156/224, 292, 245, 285, 286, 288, 290

[56] References Cited

U.S. PATENT DOCUMENTS

| | | | |
|---|---|---|---|
| 3,660,600 | 5/1972 | Yoshino | 156/382 |
| 3,772,418 | 11/1973 | Johnson | 264/331.19 |
| 3,843,601 | 10/1974 | Bruner | 260/46.5 G |
| 4,148,597 | 4/1979 | Larsen | 425/389 |
| 4,167,430 | 9/1979 | Arachi | 264/258 |
| 4,264,556 | 4/1981 | Kumar et al. | 425/405.2 |
| 4,388,263 | 6/1983 | Prunty | 264/257 |
| 4,528,156 | 7/1985 | Fukuda et al. | 528/15 |
| 4,547,337 | 10/1987 | Rozmus | 425/405.2 |
| 4,670,530 | 6/1987 | Beck | 264/331.11 |
| 4,686,271 | 8/1987 | Beck et al. | 528/15 |
| 4,704,240 | 11/1987 | Reavely et al. | 264/102 |
| 4,755,341 | 7/1988 | Reavely et al. | 264/313 |
| 4,769,197 | 9/1988 | Kromrey | 264/258 |
| 4,770,835 | 9/1988 | Kromrey | 264/257 |
| 4,772,437 | 9/1988 | Reavely et al. | 264/22 |
| 4,795,600 | 1/1989 | Kromrey | 264/130 |
| 4,879,073 | 11/1989 | Kromrey | 264/257 |
| 4,889,668 | 12/1989 | Kemp | 264/40.5 |

Primary Examiner—Jay H. Woo
Assistant Examiner—Jeremiah F. Durkin, II
Attorney, Agent, or Firm—Terry J. Anderson; Robert B. Block

[57] ABSTRACT

An isostatic pressurizing bag for consolidating a composite part has an outer flexible elastomer having a fixed resilient outside surface. The outer elastomer surrounds a closed chamber. A thermally expandable inner elastomer is located in the closed chamber. The inner elastomer is selected as an elastomer that can viscously flow or move in response to pressure. The outer elastomer is capable of flexure to relieve expansion of the inner elastomer. The bag is formed by curing plies of uncured silicone rubber around either a silicone gel or a particulated silicone rubber that is capable of phase change to a flowable gel in response to pressure. In use a composite prepreg is overlaid on a surface that defines the shape of a desired part. The isostatic pressurizing bag is located over the prepreg trapping the prepreg between the pressurizing bag and the surface. The composite prepreg is heated to its cure temperature while simultaneously applying heat and pressure to the isostatic pressurizing bag to consolidate the prepreg between the surface and the isostatic pressurizing bag.

28 Claims, 3 Drawing Sheets

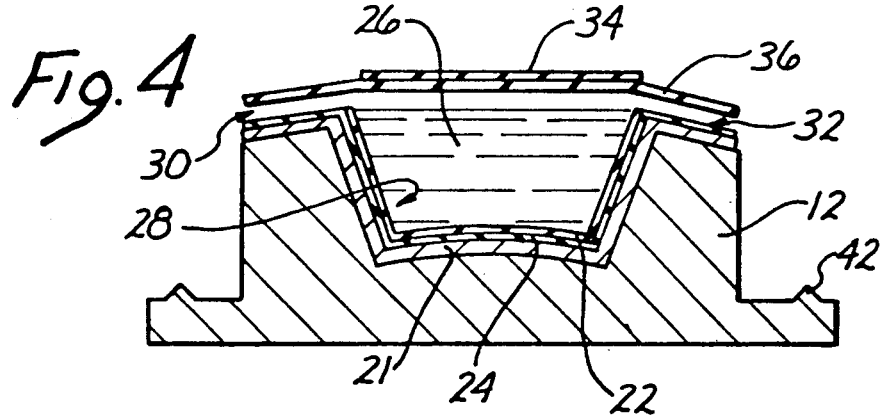
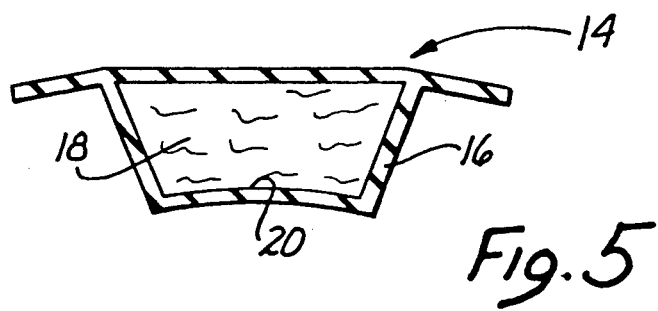
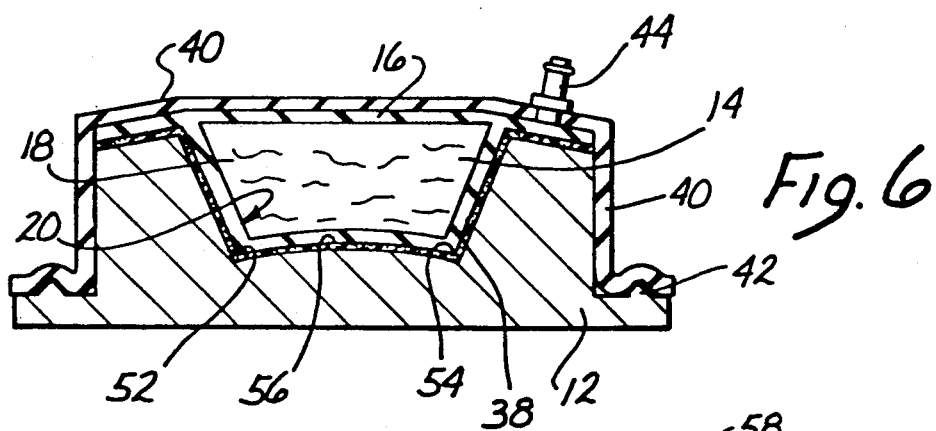
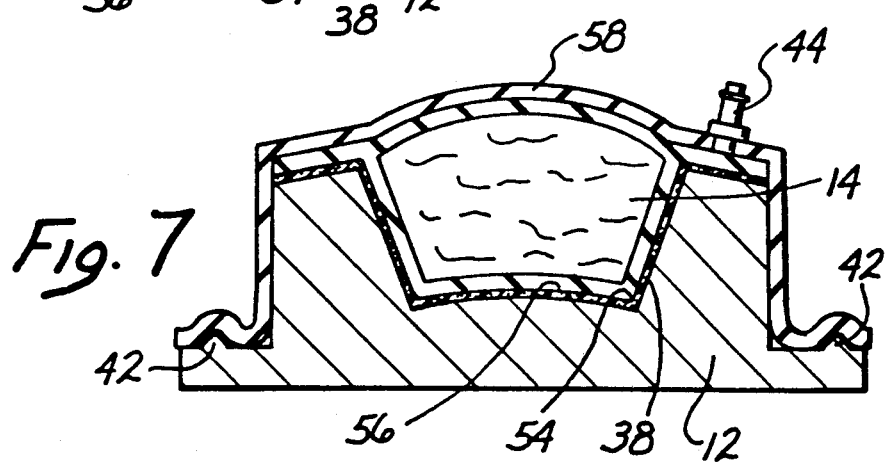

SILICONE GEL ISOSTATIC PRESSURIZING BAG AND METHOD OF USE AND MANUFACTURE

BACKGROUND OF THE INVENTION

This invention is directed to an isostatic pressurizing bag, a method of making this bag and a method of using the bag in consolidating and/debulking fibers and resins into composite structural parts.

Because of their high strength coupled with light weight, composite parts are being increasingly used as structural components in a variety of articles. Typical composite part materials include glass or graphite fibers that are embedded in resins such as epoxy, phenolic or bismaleimide resins. Generally the fiber and resin is "laid up" over a die or a mold and then cured under elevated temperature and pressure. Composite parts destined to be used in the aerospace or aircraft industries must meet exacting requirements as to their structural integrity. To meet these exacting requirements, precise control of temperature and pressure conditions is required during their cure.

A widely utilized system for forming structure composite parts utilizes what are termed "prepregs". These are sheets of fiber that have uncured resin embedded therein. The prepreg is laid over a die or mold and while being maintained in position against the die or mold it is subjected to heat and pressure to cure the prepreg into the composite material. Various apparatus are utilized to maintain the prepreg in contact with the die or mold during heat and pressure treatment. Such apparatus includes press platens, vacuum bags or trapped rubber molding systems.

Pressurizing the composite part during curing by the use of press platens is limited to essentially only planar parts due to the constrictions of geometry. Vacuum bagging is a much more versatile technique and has been used extensively. In vacuum bagging a prepreg is laid against a die or a mold. Depending upon the prepreg the prepreg may be overlaid with an appropriate bleed cloth or barrier cloth. The mold, prepreg and any bleed cloth or barrier cloth are covered with a vacuum bag. Vacuum is applied to the inside of the vacuum bag to remove all air and other volatiles between the vacuum bag and the mold surface. The mold, prepreg and vacuum bag assembly is then loaded in an oven or autoclave. Curing is accomplished by simultaneously heating and pressurizing the part in the oven or autoclave.

While vacuum bagging is very useful, in molding complicated parts vacuum bags have a tendency to bridge over concave areas and apply uneven pressure. Because of this it is very difficult to cure such complicated parts. As a result there is a high rejection rate. Thus, while vacuum bagging has many desirable features, it also has restrictions and limitations especially when it is used for complicated parts.

In trapped rubber molding a closed container is utilized. A portion of the interior of the container includes a mold or die surface that defines the part surface. A prepreg is located on such mold or die surface followed by an appropriate bleed cloth and/or barrier cloth. The remainder of the interior of the container is then filled with a preshaped solid silicone rubber member. This member is chosen to have a high coefficient of thermal expansion. The container is closed and heated. This causes the silicone rubber member to expand and in doing so it consolidates or debulks the prepreg against the mold or die surface. When the apparatus is properly configured, it applies pressure to the prepreg lay up on the die.

Fixed volume type trapped rubber molding systems are extremely simple from a mechanical standpoint since they have no moving parts. However, it is very difficult to control the pressures generated in these systems. Pressures can exceed desired and safe limits. If the solid silicone rubber member in a fixed volume container has been cured at or near room temperature and the prepreg and rubber member essentially fill up all of the void volume of the mold when it is assembled, upon heating it is very difficult to control pressures within the mold. Molds have been known to catastrophically fail due to excess pressure. To circumvent such control difficulty elaborate systems have been devised such as that described in U.S. Pat. No. 4,889,668. In this patent a trapped rubber mold system is described that utilizes a variety of pressure and temperature sensors as well as heating and cooling coils that are located in different areas of the mold. Such complications inevitably lead to increased costs of the molded part.

In order to circumvent the generation of excess pressure it has been proposed to form the solid elastomer of a trapped mold system of such a size that it does not fill the totality of the interior of the mold. In this type of trapped rubber molding the lay up, i.e. the prepreg, is not pressurized against the mold surface until a specific temperature has been reached. While this procedure does result in controllable pressure in certain uses, it does not permit maintaining pressure at the beginning or at the end of the cure cycle. Further, such a system is not necessarily uniform in the pressures achieved during continuous cycles. What was a proper ullage for the first cycle will not necessarily be the proper ullage for the second cycle, third cycle or the like. A given ullage for a desired pressure-temperature relationship during a first cycle may not necessarily be repeatable for other cycles thereafter.

In U.S. Pat. No. 4,148,597 assigned to the same assignee as this application, hydraulic pressurized inflatable diaphragms were utilized to exert pressure on a prepreg against a mold or die surface. As an extension of such fluid pressurization, recently certain silicone rubbers have become available that normally exist in a pulverized powdered state at room temperature but are converted to a gel when subjected to pressure. In U.S. Pat. Nos. 4,704,240 and 4,755,341 use of such pulverized rubber is described.

In U.S. Pat. No. 4,704,240 a prepreg is positioned on the inside of a tubular type mold to mimic the tubular shape of the mold. An expandable bag is then positioned in the interior of the tubular shape of the prepreg. The remaining space within the tubular shaped prepreg is filled with the particulate rubber. The mold is closed and heated. Pressure is applied to the prepreg by inflating the bag in the interior of the mold. The inflation pressure of the bag is transferred to the pulverized rubber and from there to the prepreg to consolidate the prepreg against the tubular mold surfaces.

In U.S. Pat. No. 4,755,314 a prepreg is positioned on a mold and covered with pulverized rubber. The prepreg, mold and pulverized rubber are then covered with a vacuum bag. External pressure applied to the vacuum bag is transferred to the pulverized rubber and from there to the prepreg surface.

One inherent disadvantage of utilizing the pulverized rubber system described in the above referenced U.S.

Pat. Nos. 4,704,240 or 4,755,341 is the degradation of the pulverized rubber resulting from elevated temperatures and/or pressures. The pulverized rubber tends to degrade or decompose during use with the by-products of its decomposition or degradation contaminating the surface of the composite part that is being formed. Since these by-products generally are oily silicone type by-products, they are very difficult to remove from a composite part surface and can interfere in bonding of the composite part to an adjacent composite part during final assembly of a multiple composite article.

To circumvent the degradation of a composite part surface by the decomposition products of particulated silicone rubbers, U.S. Pat. No. 4,795,600 suggests encapsulating the composite prepreg with a coating that is capable of being separated from the composite part after cure of the prepreg into a composite part. The coatings have to be chemically removed from the composite part after formation of the composite part. The preferred coating suggested by the patent is aluminum foil. It is removed in an alkali etch. Other suggested coatings are polymer films that are removed utilizing solvent etches. The use of such films is labor intensive Further having to subject the finished composite part to either an alkali or chemical etch subjects the composite part to possible degradation and/or contamination by the etch.

BRIEF DESCRIPTION OF THE INVENTION

It is a broad object of this invention to provide an isostatic pressurizing bag for consolidating fiber and resin components of a composite structure during lay-up and curing of these components into the composite structure. It is a further object to provide an isostatic pressurizing bag that automatically relieves any consolidating pressure beyond a desired pressure imposed during consolidation of resin and fiber into a composite part. It is an additional object to provide a method for forming such isostatic pressurizing bags and a further object to provide a method for utilizing such isostatic pressurizing bags in debulking a composite article.

In accordance with these and other objects that will become evident from the remainder of this specification, this invention provides an isostatic pressurizing bag for consolidating composite parts. The bag includes an outer flexible elastomer that serves as the outside surface of the bag and is of a resilient shape. At least a portion of the outside bag surface is capable of fitting against a composite part. The outer elastomer surrounds a closed chamber. A expandable inner elastomer is located in the chamber. The inner elastomer is capable of a viscous flow like movement in response to pressure. Further it capable of thermal expansion in response to heating. The outer elastomer is capable of flexure to relieve excess thermal expansion of the inner elastomer.

Preferably the outer elastomer is chosen as a silicone rubber. In one embodiment of the invention the inner elastomer is chosen as a silicone gel. In a further embodiment of the invention the inner elastomer is chosen as a particulated silicone rubber capable of undergoing a phase change (or an apparent phase change) to a flowable gel in response to pressure. When a silicone gel is used as the inner elastomer, the silicone rubber of the outer elastomer and the silicone gel of the inner elastomer, can be selected such that they can both be cured utilizing the same polymerization catalysts allowing them to be concurrently cured. Alternatively they can be step wise cured utilizing the same or different polymerization catalysts. Reinforcing fiber means can be added to the outer elastomer for increasing the structural strength of the outer elastomer, as for instance glass fibers embedded in the outer elastomer.

In one illustrative embodiment the chamber is formed as an imperforate chamber. In a further embodiment a heating means for heating the inner elastomer can be located in conjunction with the pressurizing bag such that at least a portion of the heating means is located in the chamber in operative association with the inner elastomer for heating the inner elastomer. Further, filler means can be positioned in the chamber in association with the inner elastomer for occupying space. Such filler means can take the form of various solid components that can physically occupy space but do not necessarily have gel properties nor do not necessarily undergo thermal expansion on the application of heat. Such fillers might include inorganic fillers such as alumina or silica, glasses, beads, metal particles, and other similar fillers.

Further, in accordance with the objects of this invention the invention provides a method of forming an isostatic pressurizing bag. The isostatic pressurizing bag is formed by locating an initial uncured ply of an outer elastomer on a surface that mimics the shape of at least a portion of a composite part. Next one of a thermally expandable gel or a thermally expandable material having apparent gel like properties is selected as an inner elastomer. The inner elastomer is located on the initial ply of outer elastomer in a position leaving an unbroken perimeter of the initial ply of outer elastomer uncovered and exposed around a periphery of the inner elastomer. Next a further uncured ply of outer elastomer is located over the inner elastomer and the exposed perimeter of the initial ply of outer elastomer. The outer elastomer is cured to intimately bond and join the plies of outer elastomer and to trap the inner elastomer in a cavity formed by a continuous flexible outer elastomer skin.

In an embodiment of the invention a particulate silicone rubber or a silicone gel is selected as an inner elastomer. The particulate silicone rubber is selected as particulated silicone rubber that is capable of undergoing a phase change (or apparent phase change) to a flowable gel in response to pressure. Preferably a silicone gel is selected as the inner elastomer. If such a silicone gel is selected, it is also cured, either simultaneously with the outer elastomer or independently, after positioning it on the initial ply of the outer elastomer.

In accordance with the objects of this invention the invention provides a further method of forming isostatic pressurizing bags. This further method includes first locating an initial ply of uncured outer elastomer on a surface that mimics the shape of a desired part or article. Next a quantity of uncured silicone gel is located on a portion of the initial ply of uncured outer elastomer. The silicone gel is located on the uncured outer elastomer leaving an unbroken perimeter of outer elastomer exposed and uncovered around the periphery of the silicone gel. As so located, the outer elastomer is positioned between the mold surface and the silicone gel. Next a further ply of uncured outer elastomer is located over the uncured silicone gel and over the exposed perimeter of the initial ply of uncured outer elastomer. The plies of uncured outer elastomer having the silicone gel thereon are maintained on the surface and they are cured, simultaneously with the silicone gel, to form a continuous flexible outer elastomer skin containing and completely surrounding a cavity of cured silicone gel.

In an alternate embodiment of the above process, the silicone gel is selected to have a cure temperature below that of the initial ply of outer elastomer. After locating the silicone gel on the initial ply of outer elastomer, the silicone gel is cured at this lower temperature leaving the initial ply of outer elastomer in an uncured state. The initial ply of uncured outer elastomer having the cured silicone gel thereon is then overlaid with the further ply of an uncured outer elastomer. The various plies of outer elastomer are cured to bond them together and to trap the cured silicone gel in a cavity of the outer elastomer.

The objects of the invention are further achieved in an additional method of forming an isostatic pressurizing bag. This additional method comprises locating an initial ply of uncured elastomer on a surface that mimics the shape of a desired part or article. Next a particulate silicone rubber is selected. The particulate silicone rubber is selected as one that is capable of undergoing a phase change (or an apparent phase change) to a flowable gel in response to application of pressure to the particulate rubber. The particulate silicone rubber is located on a portion of the initial ply of the uncured elastomer so as to leave an unbroken perimeter of uncured elastomer uncovered and exposed around the periphery of the particulated silicone rubber. As so positioned, the uncured elastomer is positioned between the surface and the particulated silicone rubber. Next a further ply of uncured elastomer is overlaid on top of the particulated silicone rubber and over the exposed perimeter of the initial ply of uncured elastomer. The initial and further plies of elastomer are cured into a continuous flexible elastomeric skin containing and completely surrounding a cavity of the particulated silicone rubber.

In each of the above processes for forming isostatic pressurizing bags of the invention, preferably a silicone rubber is selected for the outer elastomer.

In accordance with the objects of the invention the invention further includes a method of debulking a composite article. In this method a composite prepreg or other fiber and resin composite precursor is located on a surface that defines the composite part to be formed, i.e. a surface of a mold. An isostatic pressurizing bag is selected so as to have a flexible elastomeric skin surrounding a cavity of a thermal expandable elastomer. The isostatic pressurizing bag is located on the prepreg. Pressure applied to the isostatic pressurizing bag consolidates the prepreg between the surface and the isostatic pressurizing bag.

In one embodiment of the invention, pressure is applied to the isostatic pressurizing bag by overlaying the pressurizing bag with a vacuum bag and exposing the outside of the vacuum bag to elevated pressure. In a further embodiment of the invention, pressure is applied by thermally expanding the inner elastomer of the isostatic pressurizing bag while maintaining this bag fixed against the prepreg.

In even a further embodiment of the invention, simultaneous cure and consolidation of the prepreg is effected by overlaying the prepreg with the isostatic pressurizing bag and heating the prepreg and bag while applying pressure to the isostatic pressurizing bag. As the prepreg is cured it is consolidated between the surface and the isostatic pressurizing bag. Heating of the prepreg and the isostatic pressurizing bag is conveniently effected by heating in the interior of an autoclave or oven.

BRIEF DESCRIPTION OF THE DRAWINGS

This invention will be better understood when taken in conjunction with the drawings wherein:

FIG. 4 is a front elevational view in section showing the assembly of the component parts of the isostatic pressurizing bag of FIG. 1;

FIG. 5 is a front elevational view in section taken about the line 5—5 of FIG. 2;

FIG. 6 is a front elevational view in section showing an assembly of the mold of FIG. 3, the composite part of FIG. 2 and the isostatic pressurizing bag of FIG. 1 prior to the application of heat thereto;

FIG. 7 is a view similar to FIG. 6 with the exception that the components of FIG. 6 have been heated so as to expand certain portions of the isostatic pressurizing bag of the invention;

DETAILED DESCRIPTION OF THE INVENTION

For the purposes of this specification and the claims attached hereto, the words "resilient surface" are defined to mean a surface that has a defined shaped but can be deformed from that shape and then recover its original or initial shape after the deforming force is removed. The word "isostatic" is defined as meaning subject to equal pressure from every side or direction or distributing equal pressure to every side or direction.

The material selected for the inner elastomer is selected as a thermally expandable gel or other thermally expandable material that can exhibit gel like physical properties. In describing certain physical properties of the inner elastomer, the inner elastomer is noted as "flowable in response to a force" or "flowable in response to pressure" or "capable of non-compressive viscous flow-like movement in response to pressure." For the purposes of this specification and the claims appended hereto this is defined to mean that in a manner much like a gelatin, if a force (as for instance a pressurized fluid or pressure plate) is applied to the inner elastomer, the inner elastomer will give or move in concert that force and reconfigure its shape to a shape defined in part by the shape of the mechanism transmitting the force and in remaining part by the shape of the "container" or other like structure the inner elastomer is located in. If not subjected to a force sufficient to produce shear or other force sufficient to disrupt its molecular structure, the inner elastomer will retain memory of its original shape and when the force is removed it will return to its original shape. However, if the force is sufficient to cause shear or other molecular disruption, the inner elastomer will then assume a new shape.

If the inner elastomer, irrespective of it being in its original shape or being in a distorted shape, is fixed from physically moving, to relieve a force (pressure) the inner elastomer will isostatically propagate the force (pressure) to whatever structure contains the inner elastomer. Stated another way, if uninhibited from moving the inner elastomer will yield to a force and move—if inhibited from moving, it will isostatically conduct the force to the structure that inhibits its movement.

Figure 1:
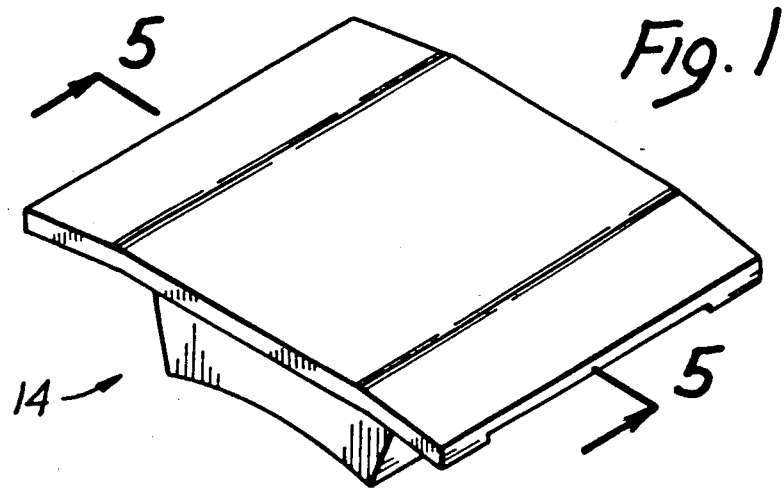
FIG. 1 is an isometric view of an isostatic pressurizing bag of the invention.
Figure 2:
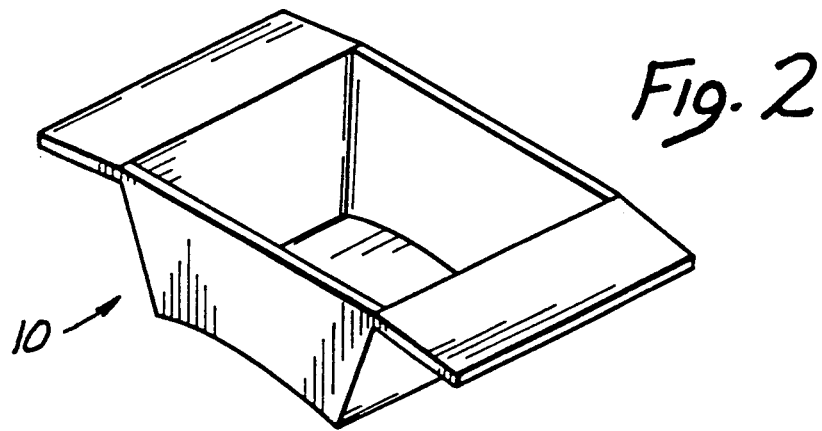
FIG. 2 is an isometric view of a composite part formed with the bag of FIG. 1.
Figure 3:
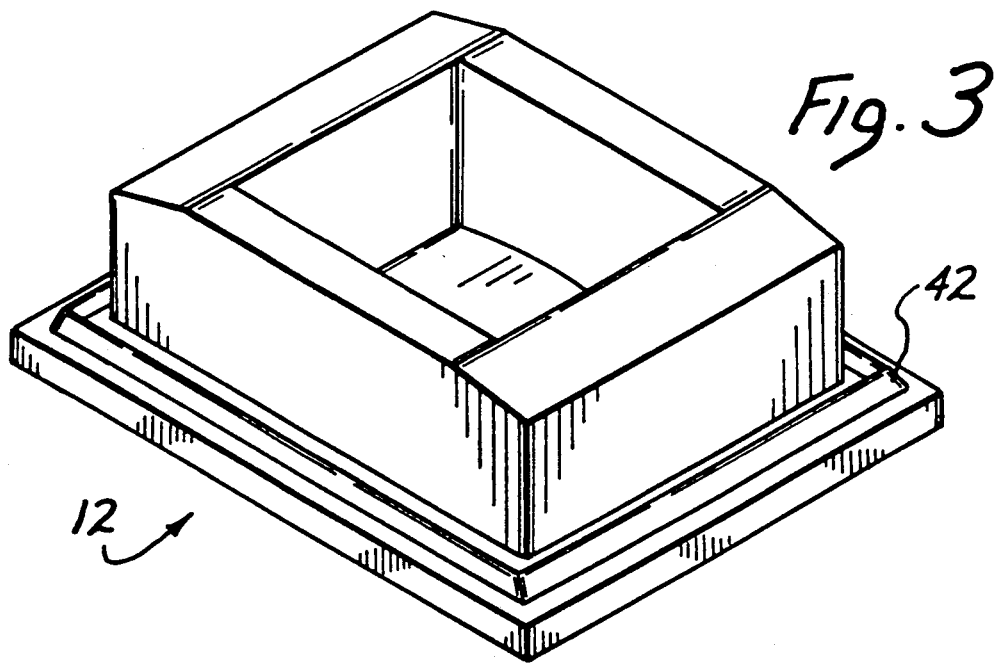
FIG. 3 is an isometric view of a mold utilized to form the composite part of FIG. 2 and utilized in conjunction with the isostatic pressurizing bag of FIG. 1.

Illustrated in FIG. 2 is a composite part 10. The composite part 10 is formed from composite material having fibers embedded in a resin. While various fibers can be impregnated with resin precursors in forming the part 10, typically it is most easily formed utilizing what is known in the art as a "prepreg." Such prepregs are sheets of fibers with uncured (or partial cured) resin already embedded therein. Since both components of the composite part are present in the prepreg sheet they are conveniently manipulated during lay up on a mold surface. The composite part 10 is formed on a mold 12 illustrated in FIG. 4. In forming the part 10 an isostatic pressurizing bag 14 of the invention as seen in FIG. 1, is utilized in conjunction with the mold 12.

In FIG. 5, the bag 14 of FIG. 1 is shown in sectional elevation view. As is evident in FIG. 5, the completed bag 14 has essentially two components. One of these is an outer skin 16 formed of a flexible elastomer. The second is an inner elastomer 18 that exhibits gel like characteristics. That is, as defined above, if subjected to a mechanical force and if uninhibited from moving, the inner elastomer will flex, flow or otherwise move but if inhibited from moving it will isostatically propagate the force. Further, the inner elastomer 18 is capable of thermally expanding in response to an increase in temperature.

Preferably a silicone rubber is selected as the outer skin 16. As such the outer skin 16 also will generally be capable of thermal expansion in response to increase in its temperature.

Presently two different materials are preferably selected for the inner elastomer 18. The first of these, the most preferred material, is a silicone gel. Such silicone gels are very stable both chemically and thermally. They are capable of fluid like movement in response to pressure. They have a positive thermal coefficient of expansion and thus will expand when heated. Because they are "flowable in response to a force" they are capable of isostatically propagating pressure throughout the totality of their mass.

An alternate material for the inner elastomer 18 is a pulverized rubber that is capable of exhibiting gel characteristics, that is flow characteristics when subjected to pressure. One such pulverized rubber is a pulverized silicone rubber that when subjected to pressure exhibits a phase change or an apparent phase change to a gel.

Irrespective whether a silicone gel or a pulverized rubber is selected for the inner elastomer 18, the inner elastomer 18 is completely surrounded or encapsulated by the outer skin 16. Essentially the outer skin 16 forms a chamber 20 that surrounds and contains the inner elastomer 18.

FIG. 4 illustrates the construction of the bag 14 of FIGS. 1 and 5. To form the outer skin 16 of the isostatic pressurizing bag 14, a single ply or multiple plies of silicone rubber are joined into an integral membrane that concurrently traps and retains the inner elastomer 18 therein. For the purposes of illustration of the invention in FIG. 4 the outer skin 16 will be illustrated as being formed from a two sheet thickness of silicone rubber. It is understood that a single sheet could be utilized or even further additional sheets might be added to increase the thickness of the skin 16.

An initial ply made up of sheets 22 and 24 of uncured silicone rubber is overlaid on a surface that mimics the shape of a composite part that is to be formed. Such a surface might be a model 21 of the part 10. The model 21 is placed in the mold 12. The sheets are laid over the model 21 and molded to the shape of the model 21. At this time the individual sheets 22 and 24 could be cured together to form a single integral ply or they can be left in an uncured state and cured later concurrently with the inner elastomer or additional plies of the outer skin 16 plus the inner elastomer.

A quantity of material 26 is located in a partial cavity 28 formed by the sheets 22 and 24 of silicone rubber. The material 26 is either one of a precursor for a silicone gel or a quantity of particulated silicone rubber that is capable of exhibiting gel like qualities when subjected to pressure. In locating the material in the partial cavity 28, the material 26 is restricted or confined only to the partial cavity 28. This leaves areas 30 and 32 of the sheets 22 and 24 "clean" in the sense that they do not have any of the material 26 located on them. The areas 30 and 32 thus form an unbroken perimeter of silicone rubber that is exposed and uncovered around the periphery of the material 26. As is evident from FIG. 4 the sheets 22 and 24 are located between the material 26 and the surface of the model 21.

If silicone gel is being utilized as the material 26, at this juncture or step it could be cured independent of or simultaneously with the sheets 22 and 24 or it can be left uncured. When the sheets 22 and 24 have not as yet been cured, independent cure of the silicone gel while still leaving the sheets 22 and 24 in an uncured state is conveniently effected by selecting the silicone gel as a silicone gel that has a cure temperature that is lower than the cure temperature of the sheets 22 and 24. This can conveniently be practiced by selecting a silicone gel that has the capability to cure at room temperature upon standing. It is easily cured by simply leaving the uncured sheets 22 and 24 with the gel thereon at room temperature for a time sufficient to effect cure of the gel. If the sheets 22 and 24 were initially cured, the gel can be left in an uncured state to be cured with subsequent layers of the skin 16 after assembly of the skin 16 is complete or if the sheets 22 and 24 were not initially cured both the sheets and the gel can be left in the uncured state and both concurrently and simultaneously cured with further sheets of the skin 16 after assembly of the skin 16 is complete. Alternately, if the sheets 22 and 24 are not as yet cured both the silicone gel and uncured sheets 22 and 24 can be simultaneously cured by heating to a temperature sufficient to cure both the gel and the sheets 22 and 24.

A subsequent layer of uncured silicone rubber composed of sheets 34 and 36 is overlaid over the periphery areas 30 and 32 and the material 26. The sheets 34 and 36 are now cured. If the earlier sheets 22 and 24 were not initially cured they would concurrently cure with the sheets 34 and 36 to form the integrated outer skin 16. If the sheets 22 and 24 were earlier cured into an integral ply, at this time as the sheets 34 and 36 are cured, sheets 34 and 36 would cure to the previously cured sheets 22 and 24 forming an integral outer skin 16.

Additionally, if a silicone gel is chosen as the material 26, and it was uncured at the time the sheets 34 and 36 are applied, then the silicone gel material 26 would concurrently cure with the sheets 34 and 36. If silicone gel was selected as the material 26 and it was previously cured or if a pulverized silicone rubber is utilized as the material 26 nc cure of the material 26 is needed at this time and the sheets 34 and 36 simply cure to the previous sheets 22 and 24 to form the integral outer skin 16.

With an elevated temperature curing silicone gel 26, it is preferred to lay up the sheets 22 and 24, add a silicone gel 26, overlay them with the sheets 34 and 36 and subsequently cure everything in one step since only a single cure cycle is needed. However, as noted above, stepwise curing of the plies forming the outer skin 16 and/or the material forming the inner elastomer 18 can be practiced. With a room temperature curing silicone gel 26, as noted independent cured of the silicone gel is easily effected by simply letting it stand at room temperature.

As depicted in FIG. 4, to form an outer skin 16 that is of the same thickness throughout, several sheets of silicone rubber were utilized, i.e. the sheets 22 and 24, and the sheets 34 and 6. Note the sheet 22 and the sheet 34 do not cover the total area of the mold 12. Because of this when the sheets 24 and 36 are bonded together their thickness is equal to the combined thickness of the sheets 34 and 36 or 22 and 24.

While a uniform thickness of the outer skin 16 is illustrated in FIGS. 4 and 5, such a uniform thickness is not necessary. Indeed it is sometimes desirable to have varying thickness in different areas of the outer skin 16. If it is desired to have an area of the outer skin 16 having a high degree of flexibility the outer skin 16 in the area of high flexibility can be made thinner, as for instance by utilizing less or thinner sheets of uncured silicone rubber. Conversely, if it is desired to have a greater thickness of silicone rubber in some area of the outer skin 16 so as to resist flexure in that area, additional sheets or thicker sheets of silicone rubber could be utilized in such thicker area.

Once the component parts of the isostatic pressurizing bag 14 are formed, essentially two zones are formed in the bag. One of these is a zone that while it has certain three dimensional structural integrity and "memory," its shape car easily be re-oriented if subjected to sufficient pressure or other force. It behaves must like a fluid under molding conditions, i.e. elevated pressure or both elevated pressure and temperature. This zone is formed by the inner elastomer 18. It is a zone that is capable of isostatically propagating force or pressure.

The other zone of the isostatic pressurized bag 18 is formed by the outer skin 16 This zone, while remaining flexible, does have a resilient or defined shape. Unless subjected to catastrophic stress or force, after flexure it exhibits "memory" and returns to its original size and shape. A portion of this resilient shape can serve to define at least a portion of the surface of the composite part 10. Other portions of the outer skin 16 do not have to correspond to surfaces that define the component part 10.

The zone of the bag 14 formed by the outer skin 16 is formed of a material that is selected to have a relatively high modulus of elasticity, as for instance from about 40 to about 80 as measured on a Shore A durometer. The zone of the bag 14 formed by the inner elastomer 18, is chosen as a material having a relatively low modulus of elasticity, as for instance below 40 as measured on a Shore A Durometer. Because this inner zone material has such a low modulus of elasticity it behaves essentially as a hydraulic fluid under molding conditions.

Referring now to FIGS. 1, 2, 3, 6 and 7, in forming the composite part 10, prepreg layers 38 are laid up within the interior of the mold 12. This is done in the manner normal for lay-up of a prepreg against a mold surface. When the desired layers and configuration of the part 10 is formed within the interior of the mold 12 a standard bleed cloth, barrier cloth or the like (not illustrated) can be laid over the prepreg in a normal manner. For the simplicity of illustration of the drawings and brevity of this specification, such commonly used bleed cloths or barrier cloths have not been illustrated or described.

The isostatic pressurizing bag 14 is next positioned over the prepreg layer or layers 38 (and over any bleed cloth, barrier cloth or the like, if used) trapping them between it and the mold 12. A vacuum bag, as for instance vacuum bag 40 shown in FIG. 6, is now utilized to encapsulate the isostatic pressurizing bag 14 and the prepreg 38 within the mold 12. The bag 40 seals in a conventional manner to a standard ridge 42 formed on the exterior of the mold 12. A vacuum port 44 allows for evacuation of the interior of the vacuum bag 40 to remove all atmospheric gasses and other volatiles from between the layers of the prepreg and between the prepreg and the pressurizing bag 14. The interior of the bag 14 can now be evacuated in a normal manner, as for instance, down to about 24 to about 27 inches of mercury. The mold having the prepreg 38, the pressurizing bag 14 and the vacuum bag 40 (and any other layers as for instance a bleed cloth) can then be loaded into a conventional autoclave. An oven may also be used. A prepreg cure cycle is then initiated.

The cure cycle is easily practiced in a conventional autoclave. Such conventional autoclaves typically are pressurized to an internal pressure of from about 25 to about 200 psi. However, the isostatic pressurizing bags of the invention could also be used in more exotic autoclaves—those capable of obtaining much higher pressures, as for instance 1000 psi or higher—if such exotic autoclaves are available for use. Irrespective of whether a conventional autoclave or an exotic autoclave is used, the internal pressure within the autoclave is transferred through the vacuum bag 40 to the isostatic pressurizing bag 14. The pressure is then transferred by the bag 14 isostatically to all the surface of the prepreg forcing the prepreg 38 against the surface of the mold to consolidate and debulk it.

As the temperature of the autoclave (or oven) is raised the materials forming the isostatic pressurizing bag 14 thermally expand. The expansion of both the inner elastomer 18 and the outer skin 16 forces the prepreg 38 against the mold 12 to debulk and/or consolidate the prepreg into a composite material. Because the inner elastomer is now a gel either by virtue of it being a silicone gel or it being a pulverized rubber that converts to a gel under pressure, it isostatically conducts pressure to the totality of the surface of the prepreg with which it is in contact. It applies the same pressure to all areas of the prepreg to debulk the totality of the prepreg including even difficult concave or corner areas.

Figure 8:
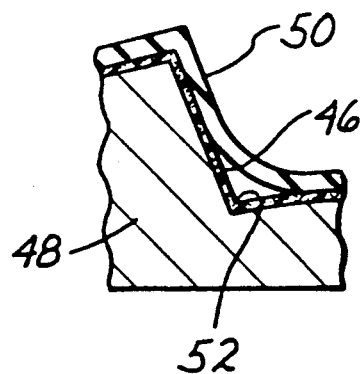
FIG. 8 is a side elevational fragmentary view of a mold, a prepreg located on the surface of the mold and a vacuum bag that is bridging a confined concave space in the mold.

In contrast to FIG. 6, FIG. 8 illustrates the same mold 12 depicted in other of the figures but without use of a pressurizing bag of the invention. As seen in FIG. 8 a prepreg 46 has been shaped against a fragment 48 of mold 12. As opposed to FIG. 6 a pressurizing bag of the invention is not being used. Instead only a vacuum bag 50 is being used to attempt consolidation of the prepreg 46. At the concave area 52 of the mold 12, the vacuum bag 50 exhibits a bridging characteristic. In the area of bridging the bag 50 does not consolidate the prepreg 46 against the surface the mold. This can cause a defect in the part that is being formed. Such defect ultimately may lead to scrapping of the part. Since the part may be an extremely complicated part and/or the prepreg an expensive prepreg material and since a lot of lay up labor time may have been incorporated into positioning the prepreg 46 into the mold 14, scrapping of the part can be a very expensive endeavor.

Contrary to the situation illustrated in FIG. 8 and as illustrated in FIGS. 6 and 7, with the isostatic pressurizing bag 14 of the invention debulking pressure is transferred by the isostatic pressurizing bag 14 to the prepreg 38 uniformly to all areas including the concave areas 52 and 54 of the mold 12. The prepreg 38 in the concave areas 52 and 54 is subjected to the same consolidating and debulking pressure as in any other area such as flat area 56. The walls, corners and other structural areas of the part throughout the entirety of the part will be of a uniform thickness, density and resin content. The part will be free of any defects in what are normally difficult areas to mold such as corners or concave areas such as the concave areas 52 and 54.

To cure the prepreg 38 into the part 10, the totality of assembly shown in FIG. 6 is located in an autoclave. The autoclave pressure and temperature cycle is initiated. As the cure cycle progresses and the individual parts of the assembly are heated to higher and higher temperatures necessary to effect the cure of the prepreg, both the outer skin 16 and the inner elastomer 18 of the isostatic pressurizing bag 14 thermally expand.

As both the inner elastomer 18 and the outer skin 16 thermally expand they isostatically press the prepreg 38 against the mold 12. If at any time during the part cure cycle the pressure generated by this thermal expansion exceeds the environmental pressure of the interior of the autoclave pressing against the outside surface of the vacuum bag 40, this pressure is automatically relieved by upward flexure of both the vacuum bag 40 and the outer skin 16 along the arc 58 as illustrated in FIG. 7. Any increase of pressure of the bag 14 against the mold 12, in response to a volume increase within the bag 14, above and beyond the external pressure pressing against the vacuum bag 40 is simply relieved by flexure of the outer skin 16 of the bag 14 in those areas of the outer skin 16 that are not confined by the mold 12. Thus, use of the isostatic pressurizing bag allows for automatic control of the pressure applied to the prepreg against the mold surface.

The situation depicted in FIG. 7 is in total contrast with that encountered in a trapped rubber mold system. In a trapped rubber mold system extremely complicated heating and cooling apparatus and computer control would be necessary to ensure that the pressure generated by the trapped rubber molding member never exceeded a certain value. Further since flexure as illustrated in FIG. 7 is not possible in a trapper rubber molding system excess pressure would not be relieved by skin flexure and might result in catastrophic failure of the mold. This, of course, in an inherently dangerous situation and must be avoided. Use of the isostatic pressurizing bag 14 automatically avoids such catastrophic occurrences.

As opposed to utilizing an autoclave, curing of the component article 10 in the mold 12 utilizing the isostatic pressurizing bag 14 could be accomplished utilizing a press. The mold 12 would be located on one press platen and a second press platen overlaid across the top of the isostatic pressurizing bag 14. Pressure applied to the isostatic pressurizing bag 14 would be transferred by the bag 14 to the prepreg to debulk and consolidate that prepreg against the mold surfaces of the mold 12. If the mold and press were located in an oven or if the mold with otherwise heated, excess pressure generated as the components of the isostatic pressurizing bag 14 thermally expanded would be relieved by flexure of the bag against the platens in a manner analogous to that illustrated in FIG. 7.

It is sometimes desirable to use a high number of plies of a prepreg in forming a composite part. A particularly useful application of an isostatic pressurizing bag of the invention is for stepwise debulking of such multiple layers or plies of prepreg as they are built up to a desired thickness. Since the fibers in the prepreg do not stretch, in order to insure that underlay plies of a multiple ply lay up do not bridge, as the plies are added, one or more plies are compressed against the mold or against previous plies using the isostatic pressurizing bag of the invention. To effect this a ply or several plies are positioned against the mold surface or against existing plies. The bag 14 is then positioned against the newly added ply or plies of prepreg and pressure is applied to the bag to isostatically debulk the added plies of prepreg initially against the mold or subsequently against earlier added plies. Such debulking pressure can be generate either mechanically in a press, in a vacuum or via atmospheric pressurization in an autoclave. Alternatively, depending on the cure temperature of the prepreg, the debulking pressure can be obtained by the thermal expansion of the inner elastomer 18 of the bag 14 by subjecting the assembly to an elevated temperature that while sufficiently high enough to thermally expand the bag 14 is not high enough to effect cure of the prepreg.

Preferred for the outer skin 16 of the isostatic pressurizing bag 14 is a stable, flexible, resilient silicone rubber. One such silicone rubber is Dow Corning X4-4643 silicone elastomer available from Dow Corning, Midland, Mich. This silicone elastomer is typically utilized as a laminating adhesive between optical surfaces, however, I have found that it serves as a very good outer skin for an isostatic pressurizing bag of the invention. This elastomer is available in uncured sheets of thicknesses varying from 0.025 inches to 0.180 inches. I have found a particularly useful isostatic pressurizing bag 14 can be formed by utilizing several layers of 0.05 inch thick sheets of this uncured silicone rubber. This elastomer is typically cured at a cure temperature of from about 180° to about 350° F. Multiple sheets or layers of this material cure into one integral layer regardless of whether they are cured stepwise or cured simultaneously. This, thus allows for preparing an isostatic pressurizing bag stepwise using intermediate curing of the components as they are overlaid on the mold or utilizing a single cure after all the components are combined into the desired structure. An alternate related silicone rubber is Dow Corning X4-4647 silicone rubber.

A further elastomer for use as the outside skin 16 is a silicone rubber designated as 9655U available from C.R.

Industries, Newhaven, Conn. This material cures at a temperature of about 240° F. at about 10 minutes.

Preferred for the inner elastomer 18, is Dow Corning Sylgard 527 silicone gel. This is a primerless silicone dielectric gel. This material is sold as a sealant for electrical circuits, as for instance, delicate electronic circuits and hybrid devices. However, I have found that it makes an excellent material for isostatically distributing pressure. Additionally it is very stable, does not degrade upon repeated cycling and is fully compatible with the above described Dow Corning X4-4643 silicone rubber.

Sylgard 527 comes as a two component system. Both of these components are liquid and are mixed prior to usage. As for instance, in FIG. 4, after the sheets 22 and 24 are located in the mold 12, the two component liquid system is poured into the partial cavity 28 ready for overlaying with additional sheets of Dow Corning X4-4643 forming the sheets 34 and 36. The Sylgard 527 silicone gel is typically cured at room temperature for 24 hours, at 150° F. for four hours, at 212° F. for one hour or at 302° F. at 15 minutes. Inert fluoro-silicone gels might also be used for the inner elastomer.

Because Dow Corning X4-4643 silicone rubber and Sylgard 527 silicone gel are both catalyzed with a platinum catalyst, a component structure of uncured materials, as for instance the structure of FIG. 4, can be formed utilizing these two materials. When the structure is assembled all of its component parts are cured concurrently. Since both the silicone rubber and the silicone gel incorporate the same catalyst, the catalyst of one does not interfere with the cure of the other, or vice versa.

Generally most silicone rubbers are cured via one of two catalytic systems. These are a platinum catalyzed system and a hydrogen peroxide catalyzed system. In certain instances, a catalyst of one system may interfere with or poison the catalyst of another system. If the materials for the skin 16 and the inner elastomer 18 are catalyzed by different catalyst, the isostatic pressurizing bag 14 of the invention would be built up stepwise with each component cured in turn. As for example if a hydrogen peroxide catalyzed rubber was utilized for the outer skin 14 and a platinum catalyzed silicone gel was utilized for the inner elastomer 18, by using a stepwise cure of each component the polymerization catalyst of one would not interfere with the cure and polymerization of the other.

Alternatively to utilizing a silicon gel for the inner elastomer 18, a particulated rubber that has the property of exhibiting gel like characteristics upon pressurization can be utilized. Such a rubber is Dow Corning X5-8023 compressible silicone rubber. It is a fully cured silicone rubber product that is supplied in small non-uniform particles. When this product is consolidated under pressure there is an apparent phase change wherein the rubber changes in color from white to translucent and assumes gel like characteristics. Upon pressurization the resulting mass behaves like a flowable gel.

The component elastomers of the isostatic pressurizing bag 14 would generally be cured to a temperature slightly higher than that experienced during the cure cycle of the composite part they are used to form, as for instance part 10. Typically curing the isostatic pressurizing bag 14 to a temperature of about 25° F. higher than that experienced during use is sufficient to stabilize the bag 14 and remove all volatiles or by-products of the uncured precursors of the bag 14.

As opposed to the isolation membranes that are described in the above referred to U.S. Pat. No. 4,795,600, since the inner elastomer 18 is completely encapsulated in an outer skin 16, and/or since a very stable silicone gel is chosen as the inner elastomer 18, the prepregs utilized to form the composite parts 10 need not be encapsulated in a protecting membrane. The silicone rubber for the outer skin 16 and the preferred silicone gel for the inner elastomer 18 are completely innocuous and are stable against degradation and decomposition during repeated cycling. Thus, they do not contaminate the composite part 10. This facilitates further joining or use of the composite part 10 in subsequent operations. I have found that isostatically pressurizing bags of the inventions that utilize a silicone gel as the inner elastomer can be cycled repeatedly without degradation. To date these bags have been used though at least 50 or 60 cycles and are still useful.

While a particulated rubber material may be utilized as the inner elastomer 18, the above referred to Sylgard 52.7 primerless silicone dielectric gel is preferred since even though the compressible X5-8023 silicone rubber particles are encapsulated in the outer skin 16, in time they could undergo degradation and decomposition upon repeated cycling. The by-products of such degradation and/or decomposition may penetrate through the outer skin 16 thus shortening the life time of the isostatic pressurizing bag 14 formed therefrom.

The isostatic pressurizing bags 14 of the invention are capable of being used multiple times. Upon cooling after a particular composite part forming cycle, they shrink back to their original size suitable for a further cycle.

It is evident that isostatic pressurizing bags, as for instance the bag 14, are capable of being formed in various sizes and configurations depending upon the geometry of the composite part being formed. While for illustrative purposes only a single imperforate chamber 20 was shown within the outer skin 16 of the bag 14, multiple chambers could be formed or several isostatic pressurizing bags might be utilized in unison in consolidating a single composite part.

Figure 9:
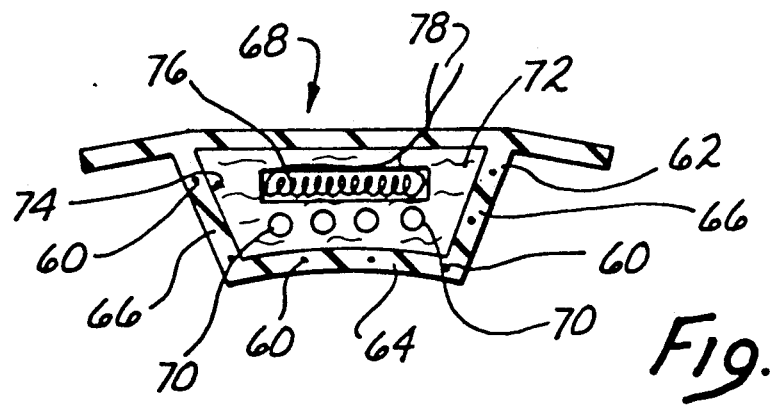
FIG. 9 is a front sectional elevational view similar to FIG. 5 showing an alternate embodiment of an isostatic pressurizing bag of the invention.

Reinforcing fibers can be located within the outer skin of a pressurizing bag of the invention. As seen in FIG. 9 fibers 60 help maintain the shape of the outer skin 62 and/or resist flexure in certain areas as, for instance, in the areas 64 and 66 of the bag 68 along the mold surface. Location of structural fibers along the mold surface, i.e. the areas 64 and 66, of the outer skin 62 tend to stabilize any shrinkage in these areas and ensure excellent contact between the isostatic pressurizing bag 68 and a prepreg.

Filler materials can be located together with the inner elastomer inside the chamber of a pressurizing bag of the invention. Such filler materials simply occupy space. Dependent upon part geometry a certain volume of the inner elastomer is needed for thermal expansion to isostatically pressurize the composite part being formed. Any volume beyond that needed for generating the necessary thermal expansion pressure could be taken up by inert fillers, as for instance glass beads, inert inorganic materials such as alumina or silica or the like or even metal particles. As is further illustrated in FIG. 9, glass beads 70 are located with the inner elastomer 72 within a chamber 74 in the bag 68. They simply occupy space—a space that is not subject to the same thermal expansion as is the inner elastomer 72.

Additionally, a heating unit can be located within the inner elastomer to directly heat the inner elastomer to thermally expand the same. This is also illustrated in FIG. 9. Depending upon the resin utilized to form the component part or part geometry it might be desirable to directly heat the expandable inner elastomer 72 to a higher temperature than a prepreg. In such instances, use of an internal heater 76 within chamber 74 would facilitate thermal expansion of the inner elastomer 72 without having to subject a prepreg to the same temperature as the inner elastomer. To supply power to the heater 76 an electrical line 78 leads from the chamber 74 through the outer skin 62. The line 78 would be brought out through an appropriate opening in an appropriate vacuum bag in a manner similar to the use of the vacuum port 44.

Figure 10:
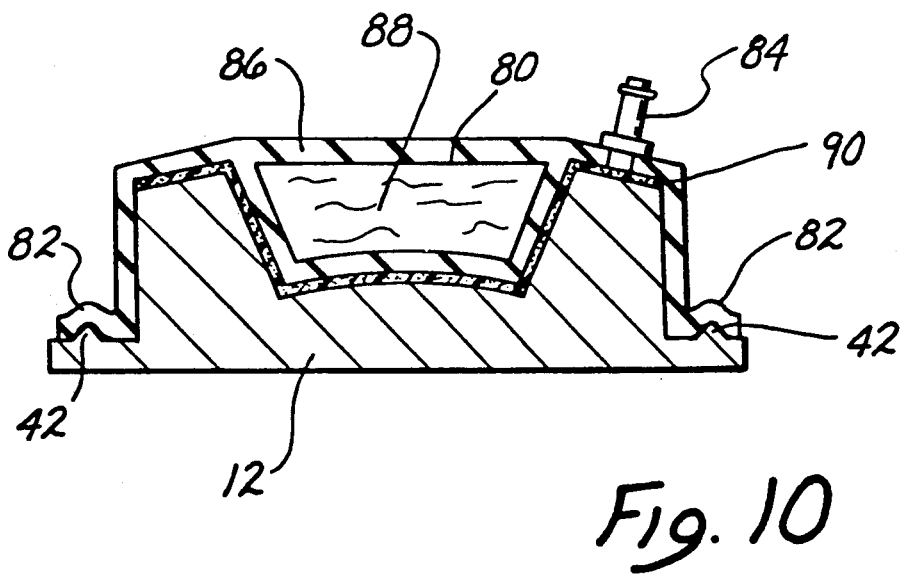
FIG. 10 is a front sectional elevational view similar to FIG. 7 showing a further alternative embodiment of an isostatic pressurizing bag of the invention.

In FIG. 10 a further isostatic pressurizing bag 80 is illustrated. The bag 80 differs from the bag 14 in two respects. First it is extended such that areas 82 of the bag 80 extends over the sides of mold 12 and over the ridge 42. Second it has a vacuum port 84 built into it. In essence the bag 80 could be considered as a composite of the bag 14 plus the vacuum bag 40.

In use, a separate vacuum bag need not be used with the bag 80. When vacuum is drawn at the port 84, the area 82 of the bag 80 seals to the ridge 42 of the mold 12. If the assembly of the mold 12, a prepreg layer 90 located on the mold 12 and the bag 80 is then placed in an autoclave, the internal pressure of the autoclave is directly transferred through the outer skin 86 of the bag 80 to its inner elastomer 88 and from there isostatically to the prepreg 90. To accommodate thermal expansion of the inner elastomer 88, the outer skin 86 will flex in the same manner depicted in FIG. 7 for the bag 14; however, as opposed to an external vacuum bag maintaining the bag 80 against the mold 12, the skin 86 of the bag 8 and thus the bag 80 itself is held to the mold 12 via a vacuum between the skin 86 and the mold 12.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes that come within the meaning and range of equivalency of the claims are therefore intended to be embraced therein.

I claim:

1. An isostatic pressurizing bag for consolidating a composite part comprising:
   an outer flexible elastomer having a resilient outside surface;
   said outer elastomer surrounding a closed chamber;
   a thermally expandable inner elastomer located in said chamber;
   said inner elastomer capable of viscous flow-like movement in response to pressure; and
   said outer elastomer capable of flexure to relieve thermal expansion of said inner elastomer.

2. A pressurizing bag of claim 1 wherein:
   at least a portion of said outside surface is shaped to mimic the shape of said composite part.

3. A pressurizing bag of claim 1 wherein:
   said inner elastomer is a silicone gel.

4. A pressurizing bag of claim 1 wherein:
   said inner elastomer is a particulated silicone rubber capable of undergoing a phase change to a flowable gel in response to pressure.

5. A pressurizing bag of claim 1 wherein:
   said outer elastomer is a silicone rubber.

6. A pressurizing bag of claim 1 wherein:
   said outer elastomer is a silicone rubber; and
   said inner elastomer is a silicone gel.

7. A pressurizing bag of claim 6 wherein:
   said silicone rubber and said silicone gel both are cured utilizing the same polymerization catalyst.

8. A pressurizing bag of claim 1 wherein:
   said chamber is an imperforate chamber.

9. A pressurizing bag of claim 1 further including:
   heating means for heating said inner elastomer, at least a portion of said heating means located in said chamber in operative association with said inner elastomer for heating said inner elastomer.

10. A pressurizing bag of claim 1 further including:
    filler means for occupying space, said filler means located in said chamber in association with said inner elastomer.

11. A pressurizing bag of claim 1 further including:
    reinforcing fiber means for adding structural strength, said reinforcing fiber means located in said outer elastomer for strengthening said outer elastomer.

12. A method of forming a pressurizing bag for use in forming composite parts comprising:
    locating an initial uncured ply of an outer elastomer on a surface that mimics the shape of at least a portion of a composite part;
    selecting as an inner elastomer one of a) a thermally expandable gel and b) a thermally expandable material having apparent gel like properties when subjected to pressure;
    locating said inner elastomer on said initial ply of outer elastomer, said inner elastomer located on said initial ply of outer elastomer in a position leaving an unbroken perimeter of said initial ply of outer elastomer uncovered and exposed around a periphery of said inner elastomer;
    locating a further uncured ply of outer elastomer over said inner elastomer and said exposed perimeter of the initial ply of outer elastomer; and
    curing at least said outer elastomer to intimately bond and join said plies of outer elastomer and to trap said inner elastomer in a cavity formed by a continuous flexible outer elastomer skin.

13. A method of forming a pressurizing bag of claim 12 further including:
    selecting a silicone gel as said inner elastomer; and
    curing said silicone gel.

14. A method of forming a pressurizing bag of claim 13 including:
    stepwise curing said silicone gel and said outer elastomers.

15. A method of forming a pressurizing bag of claim 13 including:
    concurrently curing said silicone gel and said outer elastomers.

16. A method of forming a pressurizing bag for use in forming composite parts comprising:
    locating an initial ply of uncured silicone rubber on a surface that mimics the shape of at least a portion of a composite part;
    locating an uncured silicone gel on a portion of said initial ply of said uncured silicone rubber leaving an unbroken perimeter of silicone rubber exposed and uncovered around the periphery of said silicone gel and having said uncured silicone rubber positioned between said surface and said silicone gel;

locating a further ply of uncured silicone rubber over said silicone gel and over said exposed perimeter of said initial ply of uncured silicone rubber; and curing said initial and further plies of uncured silicone rubber and said uncured silicone gel into a continuous flexible silicone rubber skin containing and completely surrounding a cavity of silicone gel.

17. A method of forming a pressurizing bag of claim 16 further including:

selecting said silicone gel as a silicone gel having a cure temperature that is lower than the cure temperature of at least said initial ply of uncured silicone rubber; and curing said silicone gel at a cure temperature below the cure temperature of initial ply of uncured silicone rubber prior to said step of locating said further ply of uncured silicone rubber over said silicone gel.

18. A method of forming a pressurizing bag of claim 17 including:

selecting said silicone gel as a silicone gel that cures at about room temperature.

19. A method of forming a pressurizing bag for use in forming composite parts comprising:

locating an initial ply of uncured silicone rubber on a surface that defines the shape of at least a portion of a composite part;

selecting a particulated silicone rubber that is capable of undergoing a phase change to a flowable gel in response to pressure;

locating said particulated silicone rubber on a portion of said initial ply of said uncured silicone rubber leaving an unbroken perimeter of uncured silicone rubber uncovered and exposed around the periphery of said particulated silicone rubber and having said uncured silicone rubber positioned between said surface and said particulated silicone rubber;

locating a further ply of uncured silicone rubber over said particulated silicone rubber and over said exposed perimeter of said initial ply of uncured silicone rubber; and curing said initial and further plies of uncured silicone rubber into a continuous flexible silicone rubber skin containing and completely surrounding a cavity of said particulated silicone rubber.

20. A method of debulking a composite article comprising:

locating a composite prepreg on a surface of a mold that defines at least in part the shape of a composite article;

selecting an isostatic pressurizing bag comprising a flexible elastomeric skin surrounding and containing a cavity of thermally expandable elastomer;

locating said isostatic pressurizing bag over said prepreg;

fixing said isostatic pressurizing bag against said prepreg; and pressurizing said bag while simultaneously maintaining said isostatic pressurizing bag fixed against said prepreg to consolidate said prepreg between said surface and said isostatic pressurizing bag.

21. The method of claim 20 wherein:

said isostatic pressurizing bag is maintained fixed against said prepreg by applying pressure to said isostatic pressurizing bag.

22. The method of claim 20 wherein:

said flexible elastomer skin of said isostatic pressurizing bag is formed of a silicone rubber.

23. The method of claim 20 wherein:

said thermally expandable elastomer of said isostatic pressurizing bag is a silicone gel.

24. The method of claim 20 further including:

pressurizing said isostatic pressurizing bag by thermal expanding said thermally expandable elastomer of said bag.

25. The method of claim 21 further including:

heating said composite prepreg and said isostatic pressurizing bag to essentially concurrently consolidate and cure said prepreg.

26. The method of claim 21 including:

covering said isostatic pressurizing bag with a vacuum bag membrane to maintaining said isostatic pressurizing bag fixed against said prepreg;

creating a pressure differential across said vacuum bag by depressurizing the interior of said vacuum bag; and placing the assembly consisting of said prepreg on said surface having said isostatic pressurizing bag and said vacuum bag thereon in an autoclave and pressurizing and heating said autoclave.

27. A method of curing and debulking a prepreg into a composite article comprising:

locating a composite prepreg on a surface of a mold that defines at least in part the shape of a composite article;

selecting an isostatic pressurizing bag comprising a flexible elastomeric skin surrounding and containing a cavity of thermally expandable elastomer;

locating said isostatic pressurizing bag over said prepreg;

fixing said isostatic pressurizing bag against said prepreg; and heating said composite prepreg and said isostatic pressurizing bag while simultaneously maintaining said isostatic pressurizing bag fixed against said prepreg to consolidate said prepreg between said surface and said isostatic pressurizing bag.

28. An isostatic pressurizing bag for consolidating a composite part comprising:

an outer elastomer and an inner elastomer;

said outer elastomer surrounding and containing said inner elastomer;

said inner elastomer comprising a thermally expandable elastomer having a modulus of elasticity less than about 40 as measure on a Shore A durometer; and said outer elastomer having a modulus of elasticity greater than about 40 as measured on a Shore A durometer.

* * * * *